United States Patent [19]
Negrin

[11] Patent Number: 5,388,895
[45] Date of Patent: Feb. 14, 1995

[54] METHOD AND SYSTEM FOR DETECTING AND CORRECTING VEHICLE SPEED REFERENCE SIGNALS IN ANTI-LOCK BRAKE SYSTEMS

[75] Inventor: Dan Negrin, Westmount, Canada

[73] Assignee: Kelsey-Hayes Company, Romulus, Mich.

[21] Appl. No.: 100,452

[22] Filed: Jul. 30, 1993

[51] Int. Cl.6 .................................................. R60T 8/32
[52] U.S. Cl. ................................... 303/103; 180/197; 303/106; 303/109; 303/95; 188/181 C
[58] Field of Search ............... 303/100, 102, 103, 109, 303/106, 91–99, 104, 105, 107, 108, 110, 111; 188/181 C, 181 R; 180/197; 364/426.01, 426.02, 426.03; 303/91-99, 104, 105, 107, 108, 110, 111

[56] References Cited

U.S. PATENT DOCUMENTS

| | | | |
|---|---|---|---|
| 5,185,702 | 2/1993 | Okubo | 303/103 X |
| 5,210,693 | 5/1993 | Kuwana et al. | 303/100 X |
| 5,246,279 | 9/1993 | Onaka et al. | 303/109 |
| 5,280,432 | 1/1994 | Kuwana et al. | 303/100 |

*Primary Examiner*—Douglas C. Butler
*Attorney, Agent, or Firm*—Brooks & Kushman

[57] ABSTRACT

A method and system for correcting an overestimated vehicle reference speed is presented. In one embodiment, speed, slip, and acceleration quantities are computed for at least one wheel of a vehicle. The speed, slip, and acceleration quantities are compared to selected speed, slip, and acceleration thresholds, respectively. A count is incremented if the quantities are consistent with at least one vehicle reference speed being overestimated. The existence of at least one overestimated vehicle reference speed is detected when the count attains a selected threshold. The vehicle reference speeds are modified when the overestimated vehicle reference speed is detected.

25 Claims, 9 Drawing Sheets

METHOD AND SYSTEM FOR DETECTING AND CORRECTING VEHICLE SPEED REFERENCE SIGNALS IN ANTI-LOCK BRAKE SYSTEMS

TECHNICAL FIELD

This invention relates to anti-lock brake systems, and more particularly, to the correction of vehicle speed reference signals generated in anti-lock brake systems.

BACKGROUND ART

When the brakes are applied on a vehicle traveling at a given velocity, braking torques are generated at each of the braked wheels. The braking torque causes a retarding or braking force to be generated at the interface between the tire and the driving surface. The braking forces generated at the wheels then cause a decrease in the vehicle velocity.

Ideally, the braking forces at the wheels increase proportionately as the driver increases the force on the brake pedal. Unfortunately, this is not always the case in braking procedures. As the braking torque and hence the braking force at the wheel is increased, the rotational speed of the braked wheels becomes less than the speed of the vehicle. When the rotational speed of a wheel is less than the vehicle speed, "slippage" is said to occur between the tire and the driving surface. This slippage, when severe, can lead to lock-up of a wheel and skidding of the vehicle. In most cases, lock-up causes an increased required stopping distance. Lock-up also causes a degradation in directional control due to a reduction in the lateral forces at the wheels.

Both of these problems associated with lock-up were addressed with the advent of anti-lock brake systems (ABS). A basic anti-lock brake system uses sensors to monitor the velocity at one or more of the wheels, decides whether the wheel is at or approaching an excessive wheel slip condition based on these velocity measurements, and modulates the braking pressure accordingly to avoid lock-up. The ABS aids in retaining vehicle stability and steerability while providing shorter stopping distances.

One method by which an excessive wheel slip condition is identified in the ABS is comparing the velocity of each wheel to a reference speed. The reference speed is an estimate of the true vehicle speed based on current and previous values of the individual wheel velocities. If the velocity of a wheel is significantly less than the reference speed, then the wheel is deemed by the ABS to be excessively slipping. The ABS then reduces the pressure actuating the brake in order to reduce brake torque. The reduction of brake torque causes a reduction of the braking force, which then causes a reduction of the slip in the wheel.

After a period of constant braking pressure following the pressure reduction, the pressure actuating the brake is increased until excessive wheel slip occurs again. The cycle of decreasing the brake pressure, maintaining constant brake pressure, and then increasing brake pressure is repeated until excessive slip no longer occurs. The parameters which define the specifics of this cycle depend on both the vehicle and the driving surface conditions.

A false indication of excessive slip can be generated by the ABS by a superfluous reference speed, in other words, an overestimated reference speed. In order to illustrate how an overestimated reference speed is formed, a sequence known as "spin-up and brake" is considered for a four wheel drive vehicle. FIG. 1 shows an example time sequence of throttle and brake commands which would cause the spin-up and brake. With the vehicle initially traveling at a given velocity, an increased throttle command 10 is given (indicated by the dashed line), thus causing the driven wheels to accelerate. If an excessively high acceleration, based on the load on the tire and the coefficient of friction at the interface between the tire and the driving surface, is commanded, the tires on the driven wheels begin to slip on the driving surface. This results in the speed of the vehicle not increasing as rapidly as the increase in the rotational speed of the driven wheels. The resulting duration of slippage between the tire and the driving surface is known as the spin-up phase 12.

After the spin-up phase 12, the throttle is assumed to be released, and then a brake command 14 is given (indicated by the solid line). The time period corresponding to the application of the brake command 14 is known as the brake phase 16.

FIG. 2 shows a wheel speed 20, reference speed 22, and actual vehicle speed 24 resulting from the throttle and brake commands given in FIG. 1. The wheel speed 20 (indicated by the solid line) is increasing at a higher rate than the actual vehicle speed 24 (indicated by the dotted line) during the spin-up phase 12. The reference speed 22 (indicated by the dashed line), used to estimate the actual vehicle speed 24 based on the wheel speed 20, typically has its rate of increase constrained by a ramp growth limiting mechanism. The ramp growth limiting mechanism constrains the rate of increase of the reference speed 22 to be less than or equal to the rate of increase of the wheel speed 20 during the spin-up phase 12. However, the reference speed 22 increases at a higher rate than the actual vehicle speed 24 during spin-up.

After the throttle is released, the wheel speed 20 decreases down to approximately the same value as the actual vehicle speed 24. However, the reference speed 22 remains near its value at the end of the spin-up phase 12. Thus, during the braking phase 16, the ABS detects a significant difference 26 between the reference speed 22 and the wheel speed 20. Since the detection of excessive slip in the ABS is based on the difference between the reference speed 22 and the wheel speed 20, the ABS falsely determines that excessive slip is present. The ABS would then begin to modulate brake pressures to prevent excessive slip, even though excessive slip is not present.

Overestimation of reference speed can also occur in other circumstances. Rapid vehicle decceleration without wheel slippage can lead to an overestimated speed reference. Such deceleration could occur during vehicle impact with a stationary or slowly moving object.

Previous prior art methods have focused on the prevention of undue growth of vehicle speed reference signals during spin-up. The major shortcomings of these methods are their difficulty in tracking slow spin-ups and correcting the reference speed resulting from an extended spin-up.

SUMMARY OF THE INVENTION

It is thus an object of the present invention to provide a method and system to detect an overestimated vehicle speed estimate in a vehicle having an anti-lock brake system.

A further object of the present invention is to provide a method and system to correct an overestimated vehicle speed estimate produced in an anti-lock brake system.

In carrying out the above objects, the present invention is a method and system to correct the overestimated vehicle speed reference signals used in anti-lock brake systems after it is detected that the speed reference signals are overestimated. There are three main conditions in the method, all of which must be satisfied, that are used to detect an overestimated reference velocity: slip must be detected at all wheels, all wheel speeds must not be locked, and no significant acceleration or deceleration must be taking place, consistent with a scenario where the vehicle is coasting.

DETAILED DESCRIPTION OF THE INVENTION

Figure 1:
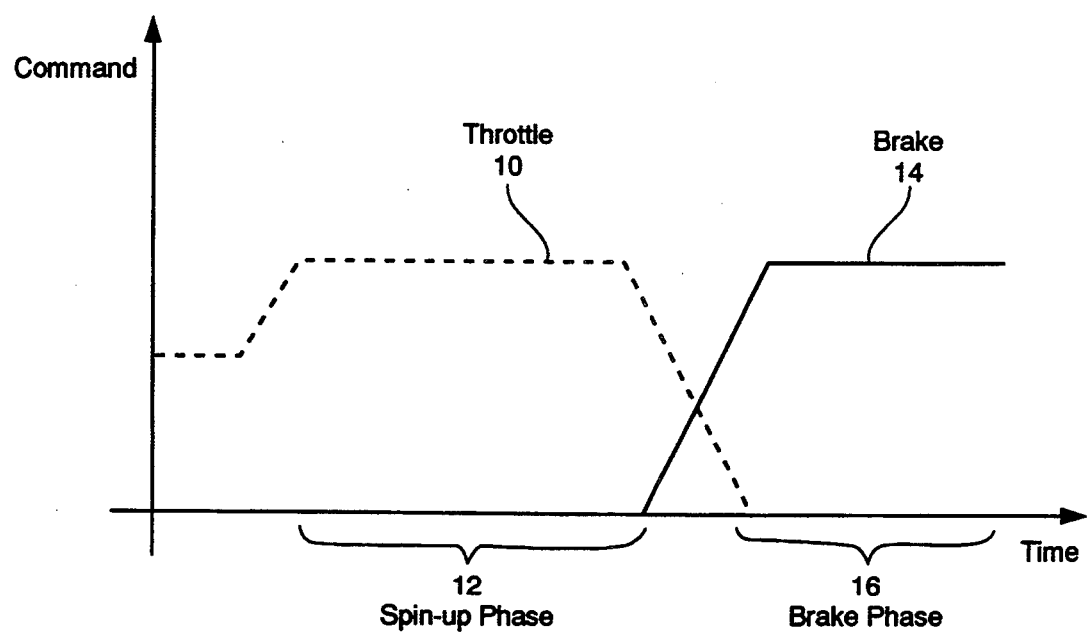
FIG. 1 is an example time sequence of throttle and brake commands causing an overestimated reference speed.
Figure 2:
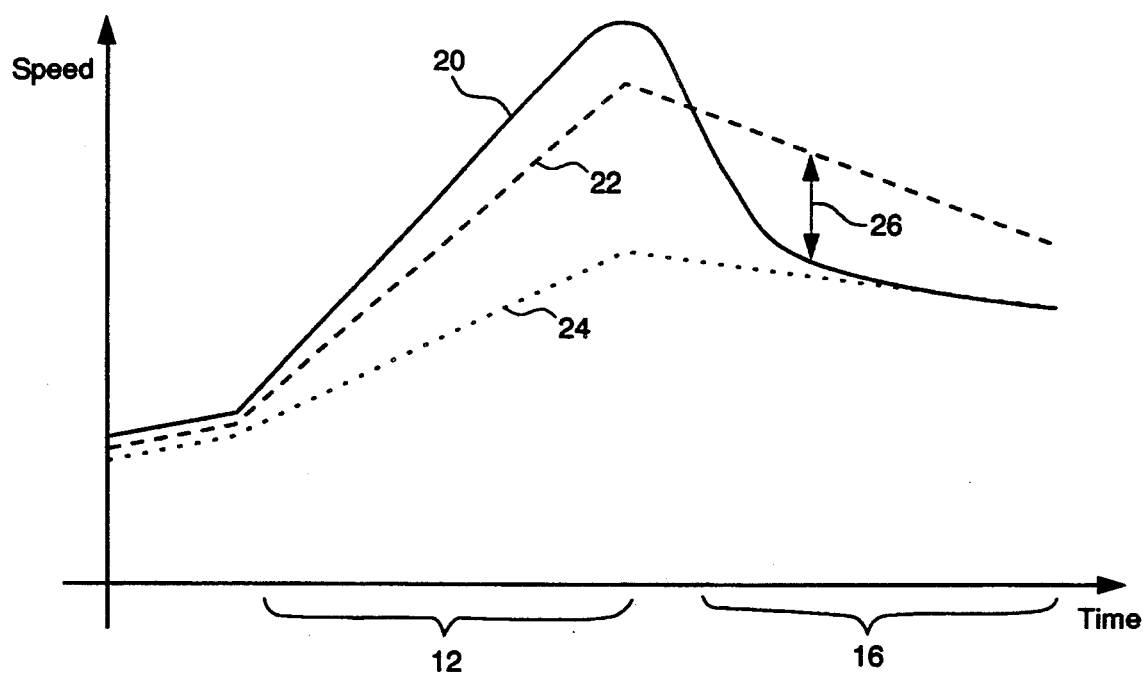
FIG. 2 is a graph of the resulting wheel speed, reference speed, and actual speed from the example throttle and brake sequence.
Figure 3:
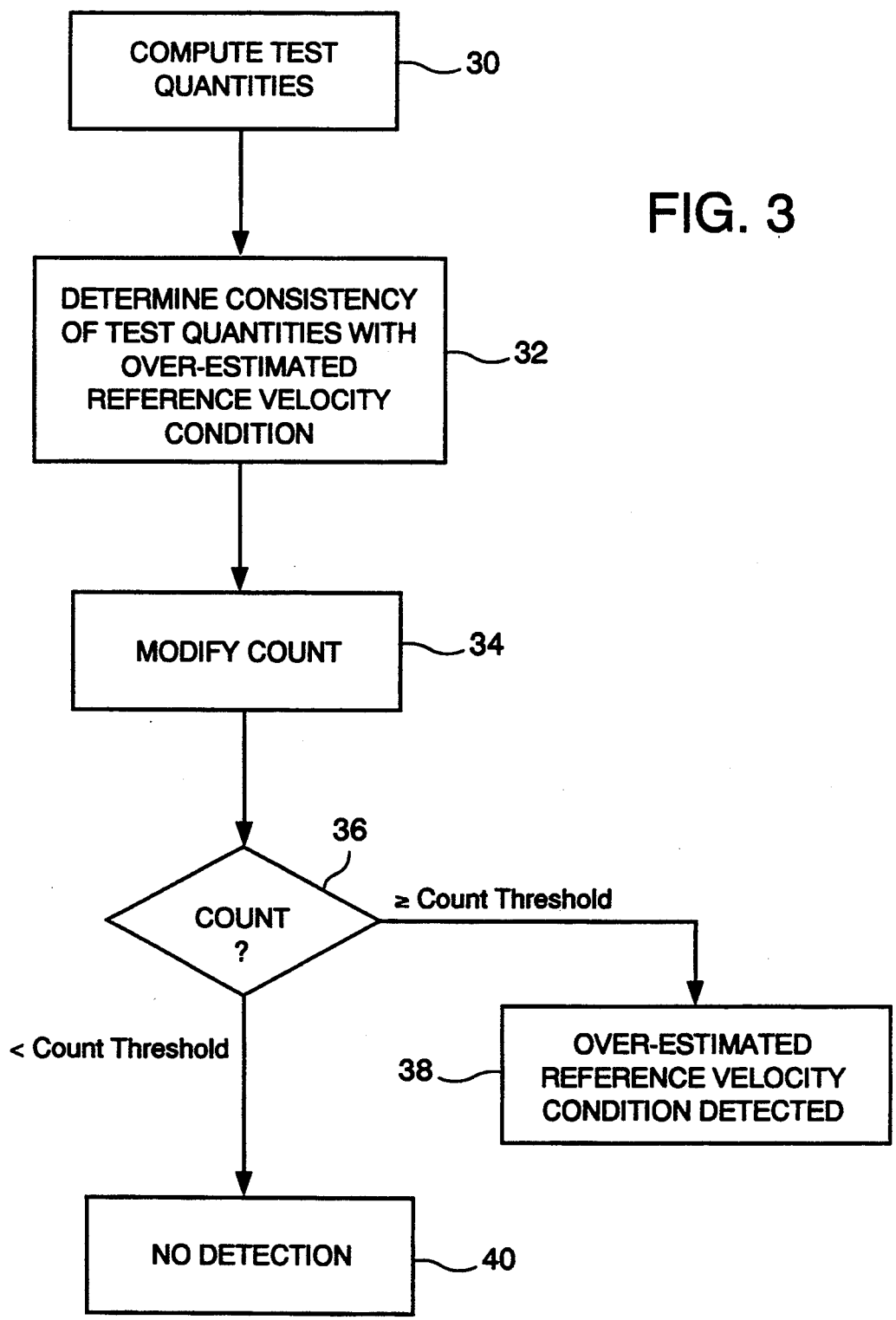
FIG. 3 is a flow chart representation of one embodiment of the present invention.

FIG. 3 shows a flow chart of one embodiment of the method for detecting the superfluous, or overestimated, reference velocity. Test quantities are computed in block 30 based on information obtained from vehicle. The consistency of the values of the test quantities with the existence of at least one overestimated reference velocity is determined in block 32. A count is modified in block 34 based on the consistency determination. The count is compared in block 36 to a selected count threshold. If the count has attained the count threshold, the overestimated reference velocity condition is detected in block 38. If the count is less than the count threshold, no detection is made in block 40. While described in terms of a method, the preferred embodiment of the present invention includes a microprocessor system for implementing the methods described herein via software programming.

One with ordinary skill in the art will recognize that antilock brake algorithms may use either a single reference velocity or a plurality of reference velocities, for instance, corresponding to each of a plurality of wheel or sensor signals. The embodiments of the present invention described herein operates effectively in either scenario.

A more specific embodiment of the present invention can be provided by specifying the test quantities which are employed. The test quantities used in the preferred embodiment are speed, slip, and acceleration. Using these test quantities, the values of speed, slip, and acceleration which are consistent with the existence of at least one overestimated reference speed are formulated. In the preferred embodiment, the three conditions which must be satisfied to indicate a possibility of an overestimated reference velocity are as follows: excessive slip must be detected at all wheels, all wheel speeds must be significantly high, and no significant wheel acceleration and deceleration must be taking place. These three conditions are selected because of their consistency with the resulting state of the ABS and the resulting motion of the wheels when the overestimated reference velocity condition is present.

The condition of excessive slip being detected at all wheels is selected since at least one wheel not having excessive slip indicates that the reference speed may be providing a reasonable estimate of the actual vehicle speed. The condition of all wheel speeds being significantly high is selected since one wheel not having significantly high speed indicates the possibility that the wheel is indeed locked. The condition of no significant wheel acceleration and deceleration is selected because significant acceleration and deceleration are present during true wheel slip due to the modulation of brake pressure in the ABS. These specificities should not be construed as limiting the scope of the invention, but as providing an illustration of the presently preferred embodiment of this invention.

Figure 4:
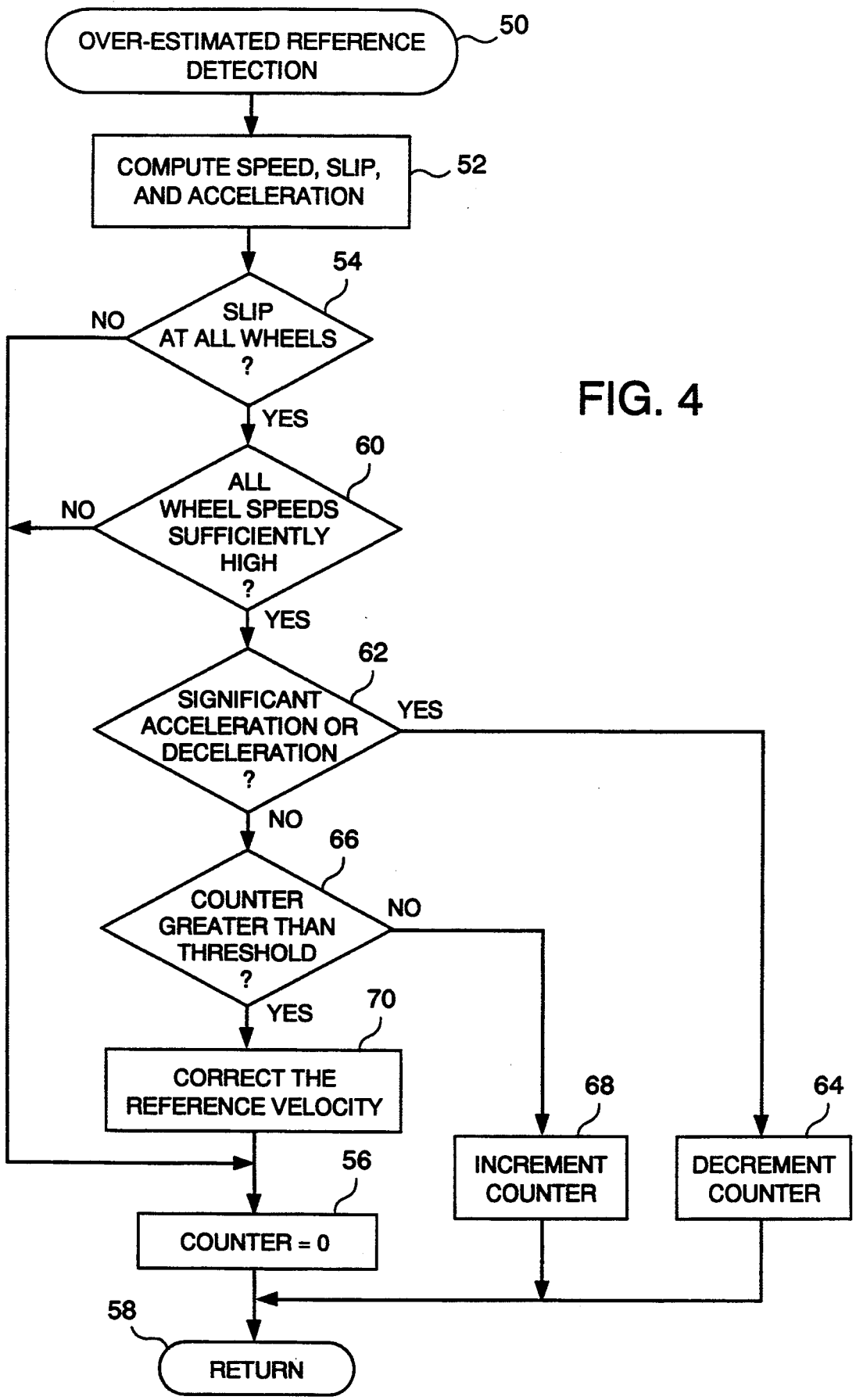
FIG. 4 is a flow chart representation of a more specific embodiment of the present invention.

FIG. 4 shows a flow chart representation of a more specific embodiment of the overestimated reference protection subroutine. The subroutine is repeatedly called by a main ABS routine during an ABS event. After entering the subroutine in block 50, the speed, slip, and acceleration are computed in block 52. The condition of excessive slip occurring at all of the wheels of the vehicle is then examined in block 54. If there is at least one wheel not experiencing excessive slip, a counter is reset to zero in block 56 and the subroutine is exited by return block 58. If all of the wheels are experiencing excessive slip, then the velocities of the wheels are examined in conditional block 60.

If at least one wheel speed is not considered to be excessively high in block 60, then the counter is reset to zero in block 56 and the subroutine is exited by the return block 58. If all of the wheel speeds are significantly high, the rates of change of the wheel speeds are examined in conditional block 62.

If there is significant wheel acceleration or significant wheel deceleration in block 62, then the counter is decremented in block 64 and the subroutine is exited by the return block 58. If there is not significant wheel acceleration or wheel deceleration, then the current value of the counter is examined in conditional block 66.

The value of the counter is assumed to be based on the increments and decrements. If the counter is less than a counter threshold, then the counter is incremented in block 68 and the subroutine is exited by the return block 58. If the counter is equal to the counter threshold, then the overestimated reference condition is detected and corrective action is taken in block 70. After correcting the reference speed in block 70, the counter is reset to zero in block 56 and the subroutine is exited by return block 58.

The execution of this subroutine can be summarized as follows. If there is at least one wheel in which excessive slip is not detected during ABS braking, then the counter is reset to zero since the existence of the overestimated reference would result in the detection of excessive slip in all wheels. If there is at least one wheel not having significantly high speed, then the counter is reset to zero since this indicates at least one wheel is indeed locked.

If all of the conditions are met for detecting the overestimated reference speed condition, then repeated calling of the subroutine causes repeated incrementation of the counter. If all wheel speeds are sufficiently high and slip is detected at all wheels, but a significant acceleration or deceleration is detected, then repeated calling of the subroutine causes repeated decrementation of the counter. Finally, if the counter is to be incremented, i.e., if all of the conditions are met for detecting the overestimated reference speed condition, and the counter is already at its threshold, then action is taken to correct the reference speed.

Figure 5:
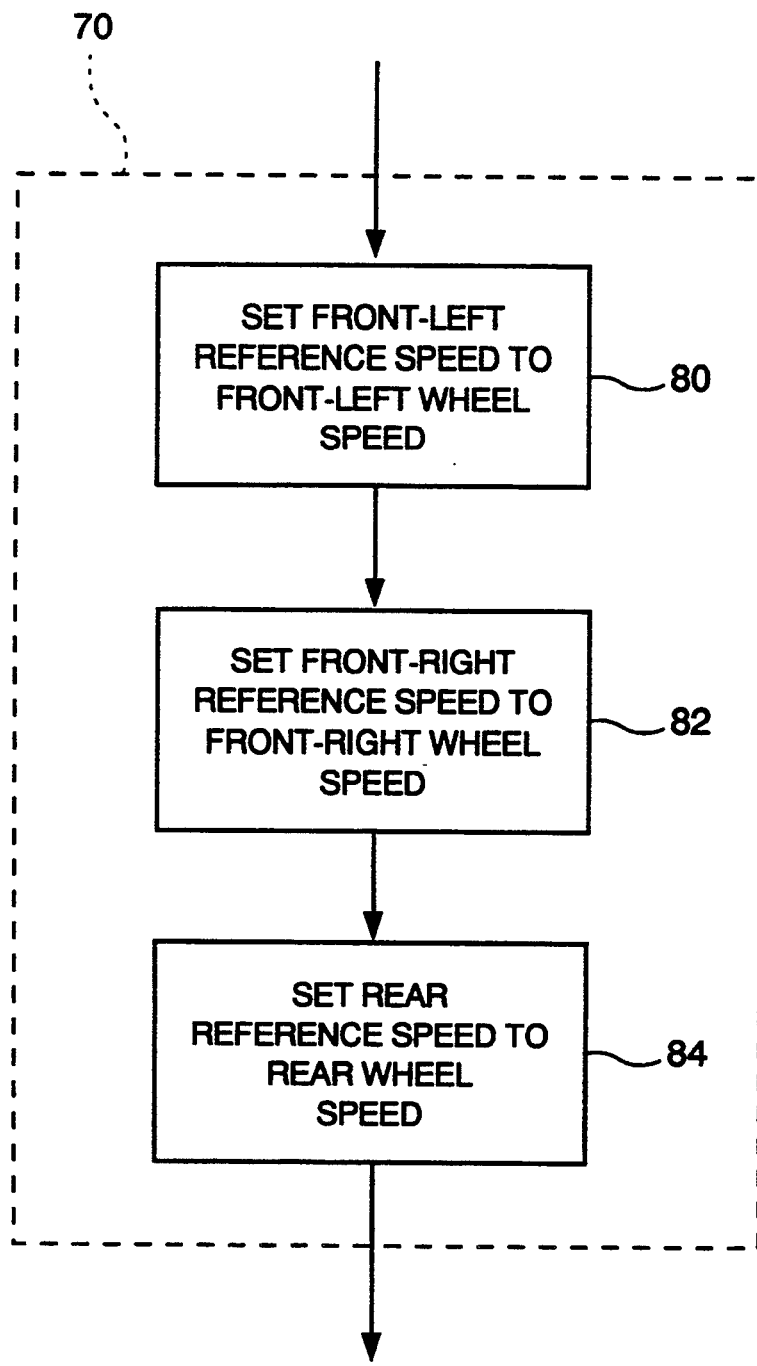
FIG. 5 is a flow chart representation of the corrective action taken to the reference speed in the present invention.

FIG. 5 shows an example of the corrective action 70 taken to the reference speed for a vehicle having ABS control of the front-left, front-right, and rear wheels. When the overestimated reference speed condition is detected, the three reference velocities are set to their corresponding wheel velocities. Block 80 shows the front-left reference speed being set to the measured front-left wheel speed. Block 82 shows the front-right reference speed being set to the measured front-right wheel speed. Block 84 shows the rear reference speed being set to the measured rear wheel speed.

Figure 6:
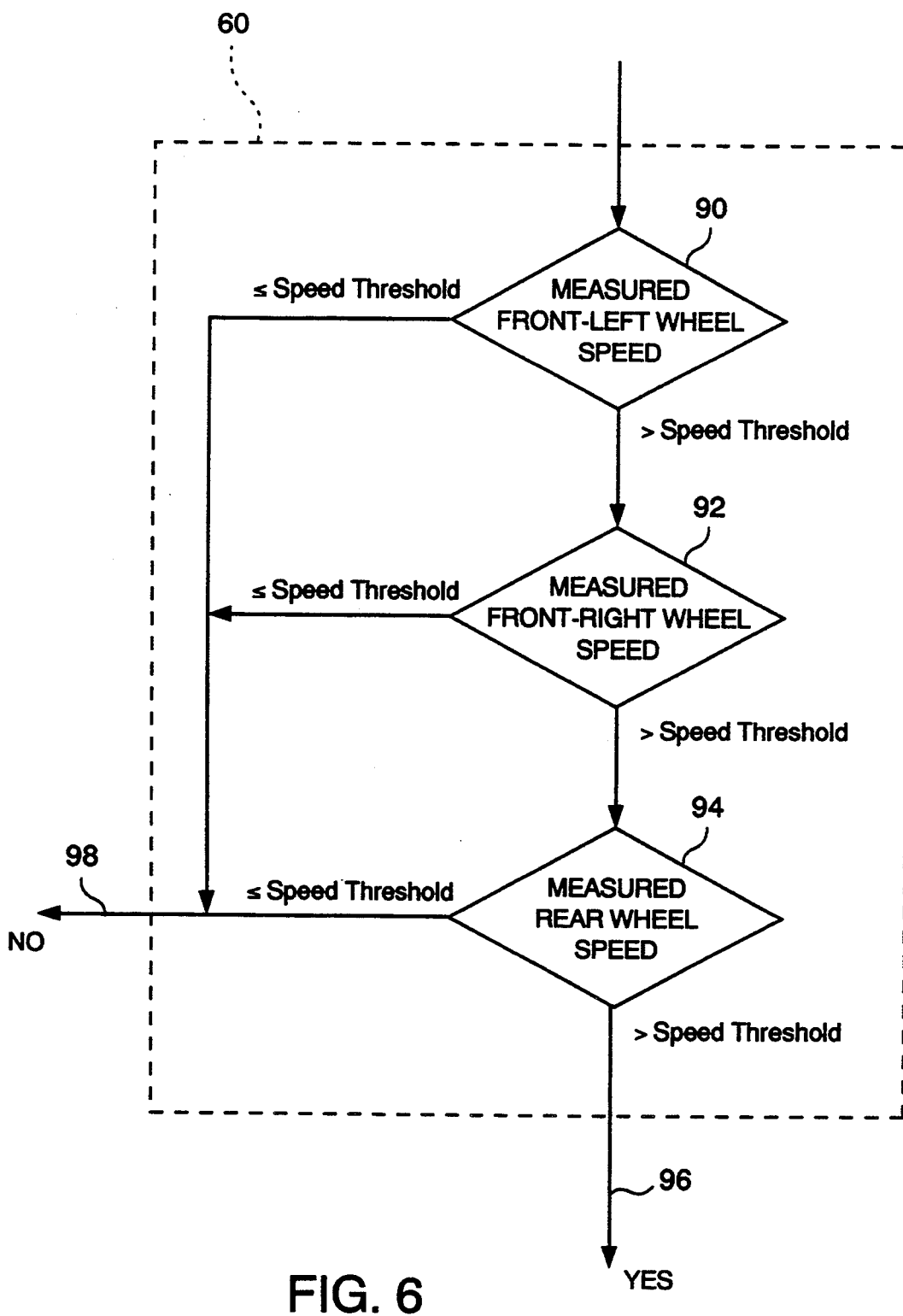
FIG. 6 is a flow chart representation of a method of testing for sufficiently high wheel speeds in the present invention.

FIG. 6 shows an embodiment of the test of sufficiently high wheel speeds given in block 60 for the vehicle having ABS control of the front-left, front-right, and rear wheels. All three independently-measured wheel speeds are compared to a speed threshold. Block 90 compares the front-left wheel speed to the speed threshold. If the front-left wheel speed is greater than the speed threshold, then block 92 compares the front-right wheel speed to the speed threshold. If the front-right wheel speed is greater than the threshold, then block 94 compares the rear wheel speed to the speed threshold. If the rear wheel speed is greater than the threshold, then all wheel speeds are deemed to be significantly high 96. If any of the measured wheel speeds are less than or equal to the speed threshold, then the wheel speeds are not considered to be significantly high 98.

It is noted that the ordering of these three velocity threshold tests is not limited to the ordering in FIG. 6. Any permutation of the threshold tests can be employed. One skilled in the art also will recognize that different speed thresholds can be used for different wheels.

Figure 7:
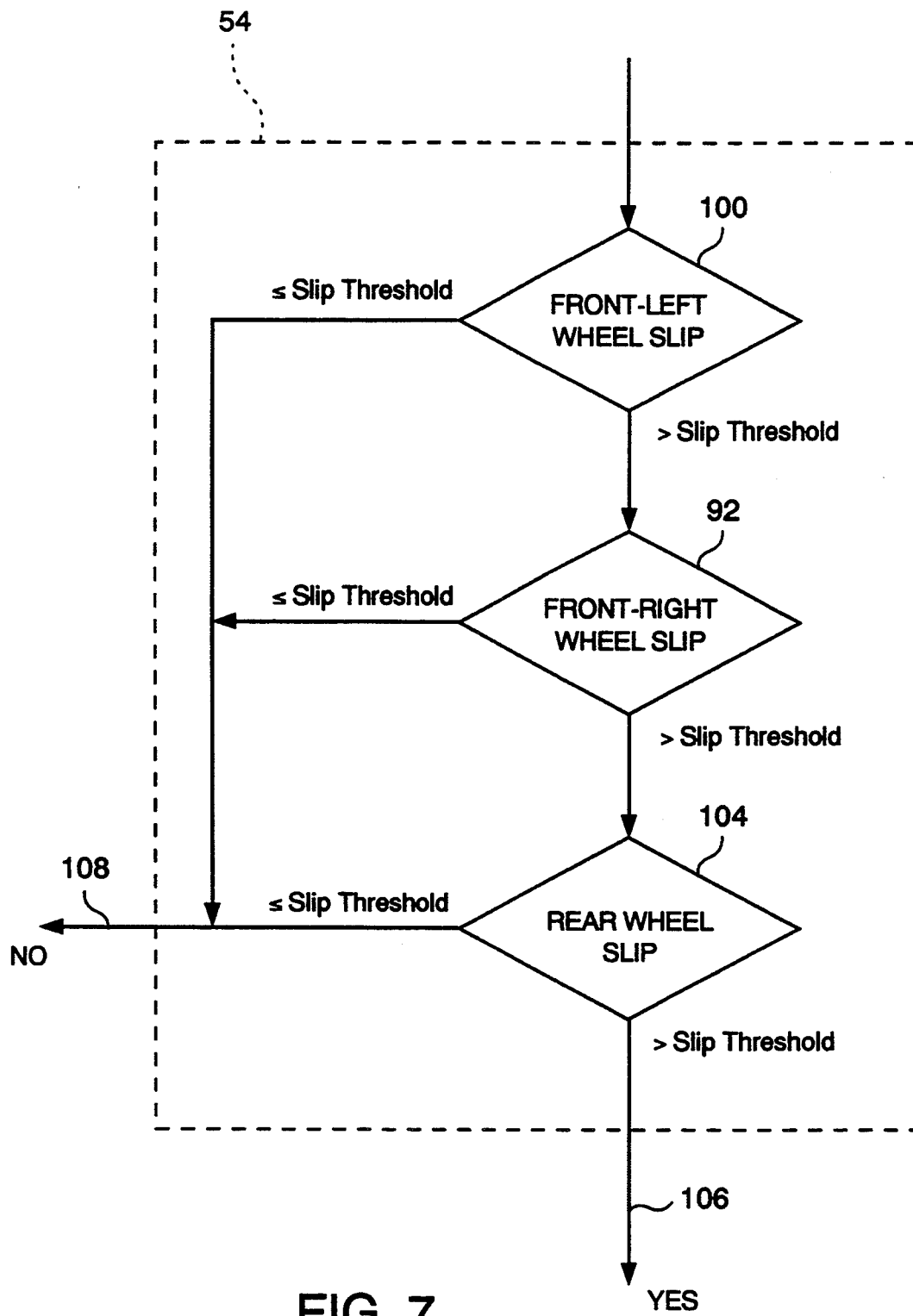
FIG. 7 is a flow chart representation of a method of testing for slip at the wheels in the present invention.

FIG. 7 shows an embodiment of the test for excessive slip at all wheels, given in block 54, for the vehicle having ABS control of the front-left, front-right, and rear wheels. All three wheel slips are compared to a slip threshold. Block 100 compares a front-left wheel slip to a slip threshold. If the front-left wheel slip is greater than the slip threshold, then block 102 compares a front-right wheel slip to the slip threshold. If the front-right wheel slip is greater than the slip threshold, then block 104 compares the rear wheel slip to the slip threshold. If the rear wheel slip is greater than the slip threshold, then all wheel slips are deemed to be excessive 106. If any of the wheel slips are less than or equal to the slip threshold, then the wheel slips are not considered to be significantly high 108. One skilled in the art will recognize that different slip thresholds can be used for different wheels, and that any ordering of the slip threshold tests can be employed.

Figure 8:
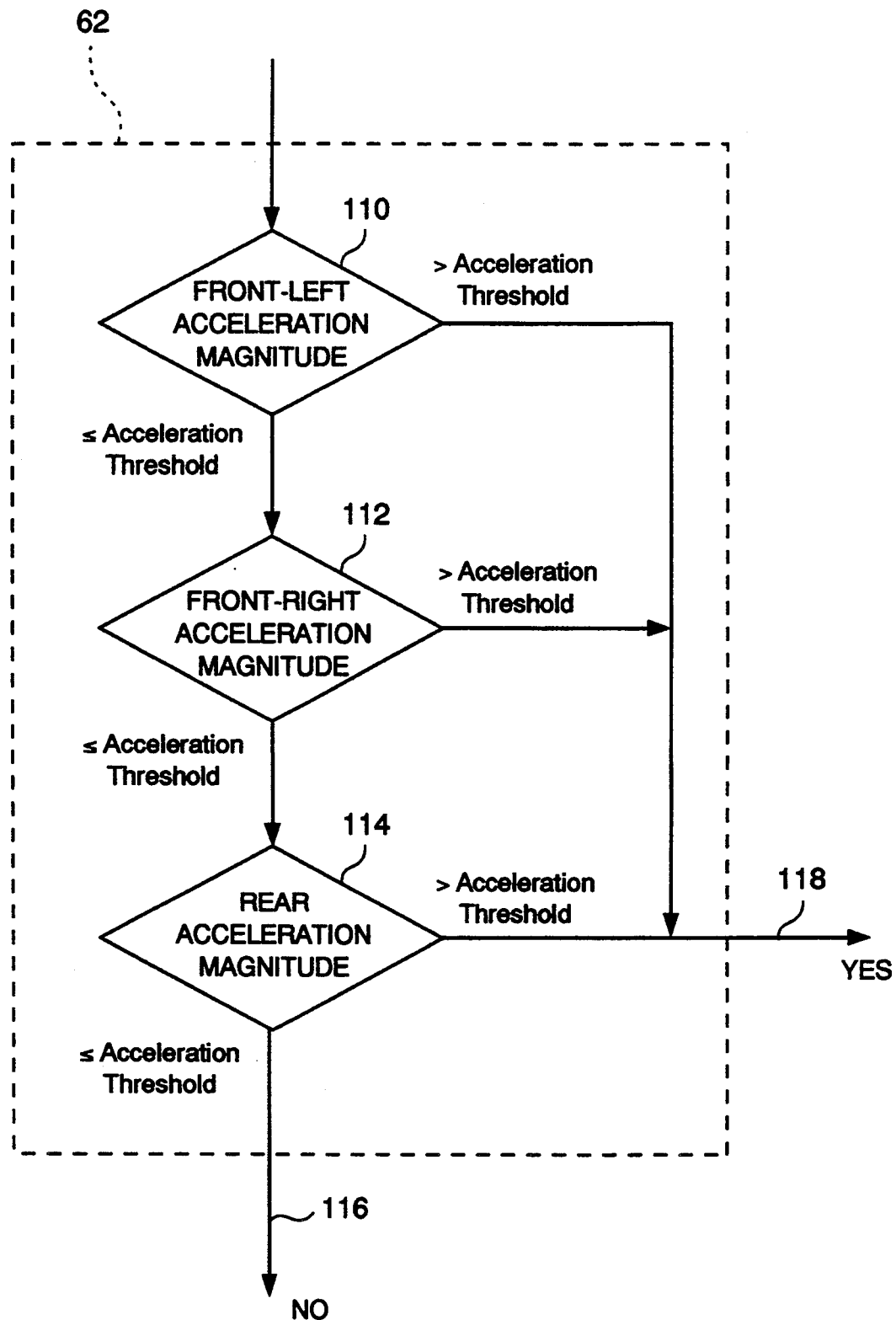
FIG. 8 is a flow chart representation of a method of testing for acceleration at the wheels in the present invention.

FIG. 8 shows an embodiment of the test for significant acceleration or deceleration at all wheels, given in block 62, for the vehicle having ABS control of the front-left and front-right wheels separately, and rear wheels together, based upon separate wheel speed sensors for each of the front wheels and one collective wheel speed sensor for the rear wheels. The magnitudes, i.e., absolute values, of the three wheel accelerations are compared to an acceleration threshold. Block 110 compares a front-left wheel acceleration magnitude to the acceleration threshold. If the front-left wheel acceleration magnitude is less than or equal to the acceleration threshold, then block 112 compares a front-right wheel acceleration magnitude to the acceleration threshold. If the front-right wheel acceleration magnitude is less than or equal to the acceleration threshold, then block 114 compares the rear wheel acceleration magnitude to the acceleration threshold. If the rear wheel acceleration magnitude is less than or equal to the acceleration threshold, then no significant acceleration is deemed to be present 116. If any of the wheel acceleration magnitudes are greater than the acceleration threshold, then significant acceleration is considered to be present 118. One skilled in the art will recognize that different acceleration thresholds can be used for different wheels, and that any ordering of the acceleration threshold tests can be employed. Moreover, each wheel acceleration can be compared to separate acceleration and deceleration thresholds to provide a more general embodiment of block 62.

While this embodiment of the present invention has been described in terms of a three-wheel sensor configuration, one of ordinary skill in the art will recognize that the present invention would also apply to configurations with any arbitrary number of wheel speed sensors. For instance, the use of four quantities of slip, speed, and acceleration, one for each of four wheels, is contemplated as well as the use of one or two sets of test quantities corresponding to one or two controlled wheels.

Figure 9:
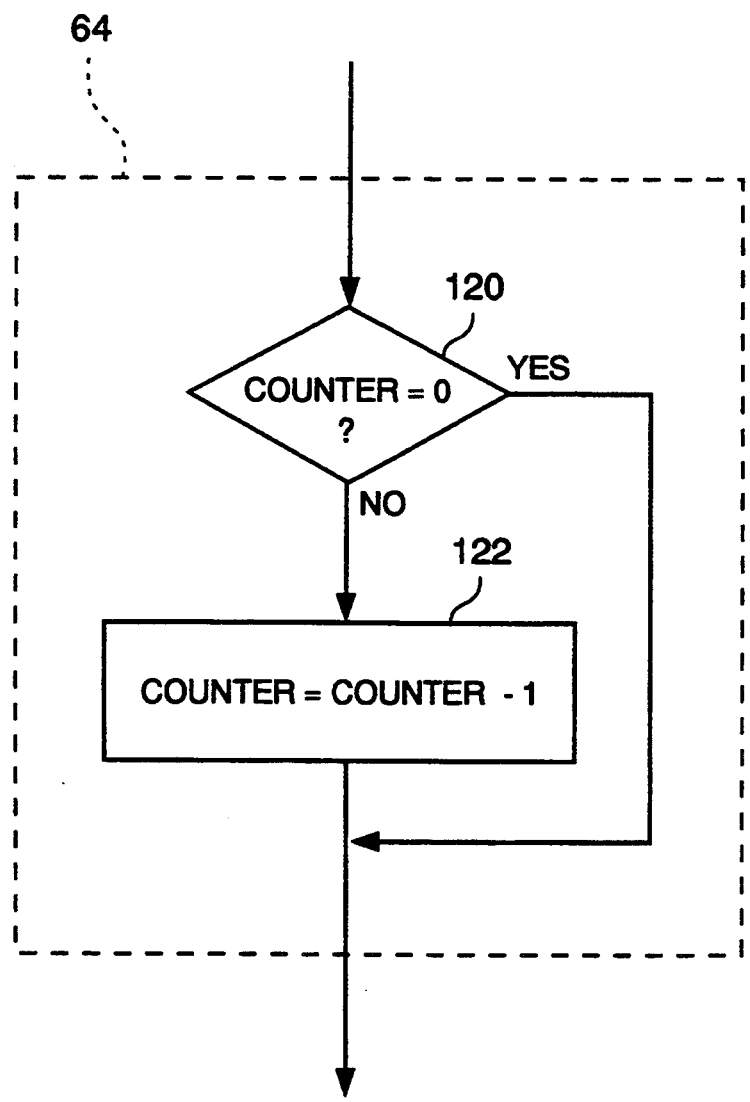
FIG. 9 shows a modification of the decrement function for the counter.

FIG. 9 shows a modification of the decrement function 64 for the counter. A conditional block 120 examines if the counter is equal to zero before decrementing the counter in block 122. If the counter is not equal to zero, then the counter is decremented 122. If the counter is equal to zero, then the counter is not decremented. This ensures that the counter does not assume a value less than zero.

While the embodiments of the present invention have been described in terms of wheel speeds and wheel speed signals, one with ordinary skill in the art will recognize that other measurements indicative of velocity, such as drivetrain velocity, or the velocity of one or more differential gears, can be used. In this case, the measured velocities relate generally to wheel velocity, but not necessarily to the velocity of a particular wheel. In particular, the test quantities of the present invention should be broadly constructed to consider information derived from such sources.

Further, while the embodiments of the present invention described above make reference to incrementing and decrementing a counter, one with ordinary skill in the art will recognize that any constructive modification which serves to successively move the count in a consistent direction, up or down, could replace any incremental change. Similarly, any destructive adjustment which serves to successively move the count in a direction, opposite from the direction of the constructive modification, could replace any decremental change.

While the best mode for carrying out the invention has been described in detail, those familiar with the art to which this invention relates will recognize various alternative designs and embodiments for practicing the invention as defined by the following claims.

What is claimed is:

1. A method of detecting and correcting an overestimated reference speed for a vehicle having a plurality of wheels and an anti-lock brake system, the vehicle being capable of generating a speed signal based upon the speed of each wheel in a selected subset of the plurality of wheels and capable of calculating at least one reference speed, the method comprising the steps of:
    (a) computing test quantities for each corresponding wheel of the selected subset of wheels based on the corresponding speed signal;
    (b) determining a consistency of the test quantities with an overestimated reference speed condition by comparing the test quantities with predetermined thresholds;
    (c) detecting the overestimated reference speed condition based upon the consistency of the test quantities with the overestimated reference speed condition;
    (d) correcting at least one reference speed when the overestimated reference speed condition is detected; and
    (e) controlling the anti-lock brake system based on the corrected reference speed.

2. The method of claim 1 wherein the overestimated reference speed condition results from a spin-up and brake procedure.

3. The method of claim 1 wherein steps (a), (b), (c), and (d) are repeated sequentially.

4. The method of claim 1 wherein the step of detecting includes the steps of:
    maintaining a count based upon the consistency of the test quantities with the overestimated reference speed condition; and
    comparing the count to a predetermined count threshold.

5. The method of claim 1 wherein the test quantities comprise a quantity representative of a speed of the corresponding wheel.

6. The method of claim 5 wherein the test quantities further comprise a quantity representative of a slip of the corresponding wheel.

7. The method of claim 6 wherein the test quantities further comprise a quantity representative of an acceleration of the corresponding wheel.

8. The method of claim 7 wherein the step of determining consistency comprises the steps of:
    comparing each wheel slip quantity to a slip threshold;
    comparing each wheel speed quantity to a speed threshold; and
    comparing each wheel acceleration quantity to a range defined by an upper acceleration threshold and a lower acceleration threshold.

9. The method of claim 8 wherein the step of determining consistency further comprises the step of:
    determining that the test quantities are consistent with the overestimated reference speed condition if each wheel slip quantity exceeds the slip threshold, each wheel speed quantity exceeds the speed threshold, and each wheel acceleration quantity is less than the upper acceleration threshold and greater than the lower acceleration threshold.

10. The method of claim 1 wherein the subset of wheels comprise a front-left wheel, a front-right wheel, and at least one rear wheel.

11. The method of claim 10 wherein step of correcting comprises the steps of:
    setting a front-left reference speed based on the front-left wheel speed;
    setting a front-right reference speed based on the front-right wheel speed; and
    setting a rear reference speed based on the rear wheel speed.

12. A method of detecting and correcting overestimated reference speeds for a vehicle having a front-right wheel, a front-left wheel, and a rear axle with two rear wheels, the vehicle being capable of generating a first speed signal representative of a speed of the front-right wheel, a second speed signal representative of a speed of the front-left wheel, and a third speed signal representative of a speed of at least one wheel on the rear axle, the vehicle further being capable of calculating a first reference speed for the front-right wheel, a second reference speed for the front-left wheel, and a third reference speed for at least one wheel on the rear axle, the method comprising the steps of:
    (a) computing a first speed quantity representative of the speed of the front-right wheel, a first slip quantity representative of a slip of the front-right wheel, and a first acceleration quantity representative of an acceleration of the front-right wheel, based on the first speed signal;
    (b) computing a second speed quantity representative of the speed of the front-left wheel, a second slip quantity representative of a slip of the front-left wheel, and a second acceleration quantity representative of an acceleration of the front-left wheel, based on the second speed signal;
    (c) computing a third speed quantity representative of the speed of at least one rear wheel, a third slip quantity representative of a slip of at least one rear wheel, and a third acceleration quantity representative of an acceleration of at least one rear wheel, based on the third speed signal;
    (d) comparing the first slip quantity to a first slip threshold;
    (e) comparing the second slip quantity to a second slip threshold;
    (f) comparing the third slip quantity to a third slip threshold;
    (g) comparing the first speed quantity to a first speed threshold;
    (h) comparing the second speed quantity to a second speed threshold;
    (i) comparing the third speed quantity to a third speed threshold;
    (j) comparing the first acceleration quantity to a first lower acceleration threshold and a first upper acceleration threshold;
    (k) comparing the second acceleration quantity to a second lower acceleration threshold and a second upper acceleration threshold;

(l) comparing the third acceleration quantity to a third lower acceleration threshold and a third upper acceleration threshold;

(m) incrementing a count if the first slip quantity exceeds the first slip threshold, the second slip quantity exceeds the second slip threshold, the third slip quantity exceeds the third slip threshold, the first speed quantity exceeds the first speed threshold, the second speed quantity exceeds the second speed threshold, the third speed quantity exceeds the third speed threshold, the first acceleration quantity is less than the first upper acceleration threshold and greater than the first lower acceleration threshold, the second acceleration quantity is less than the second upper acceleration threshold and greater than the second lower acceleration threshold, and the third acceleration quantity is less than the third upper acceleration threshold and greater than the third lower acceleration threshold;

(n) reducing the count by one if the first slip quantity exceeds the first slip threshold, the second slip quantity exceeds the second slip threshold, the third slip quantity exceeds the third slip threshold, the first speed quantity exceeds the first speed threshold, the second speed quantity exceeds the second speed threshold, the third speed quantity exceeds the third speed threshold, at least one of the first, second, and third acceleration quantities is greater than the corresponding first, second, and third upper acceleration threshold or less than the corresponding first, second, and third lower acceleration threshold, and the count is not equal to zero;

(o) setting the first reference speed equal to the first speed quantity if the count attains a predetermined count threshold;

(p) setting the second reference speed equal to the second speed quantity if the count attains the predetermined count threshold;

(q) setting the third reference speed equal to the third speed quantity if the count attains the predetermined count threshold; and (r) controlling the anti-lock brake system based on the first reference speed, the second reference speed, and the third reference speed;

wherein steps (a) through (r) are repeated.

13. The method of claim 12 further comprising the steps of:

resetting the count to zero if at least one of the first, second, and third slip quantities is less than the corresponding first, second, and third slip threshold;

resetting the count to zero if at least one of the first, second, and third speed quantities is less than the corresponding first, second, and third speed threshold; and resetting the count to zero after the steps of setting the first, second, and third reference speeds, if the count attains the predetermined count threshold.

14. A system for detecting and correcting an overestimated reference speed condition for a vehicle having a plurality of wheels and an anti-lock brake system, the vehicle being capable of generating a speed signal based upon the speed of each wheel in a selected subset of the plurality of wheels and capable of calculating at least one reference speed, the system comprising:

computing means, operatively associated with the speed signals, for computing test quantities for each corresponding wheel of the selected subset of wheels based on %he corresponding speed signal;

decision means, operatively associated with the computing means, for determining a consistency of the test quantities with the overestimated reference speed condition by comparing the test quantities to predetermined thresholds;

detecting means, operatively associated with the decision means for detecting the overestimated reference speed condition based upon the consistency of the test quantities with the overestimated reference speed condition;

correcting means, operatively associated with the detecting means, for modifying at least one reference speed when the overestimated reference speed condition is detected; and controlling means, operatively associated with the correcting means, for controlling the anti-lock brake system based on the modified reference speed.

15. The system of claim 14 wherein the detecting means includes a counter, operatively associated with the decision means, whose count is maintained based on the consistency of the test quantities with the overestimated reference speed condition, and wherein the detecting means compares the count to a predetermined count threshold.

16. The system of claim 14 wherein the overestimated reference speed condition results from a spin-up and brake procedure.

17. The system of claim 16 wherein the test quantities comprise a quantity representative of a speed of the corresponding wheel.

18. The system of claim 17 wherein the test quantities further comprise a quantity representative of a slip of the corresponding wheel.

19. The system of claim 18 wherein the test quantities further comprise a quantity representative of an acceleration of the corresponding wheel.

20. The system of claim 19 wherein the decision means comprise:

first comparison means for comparing each wheel slip quantity to a slip threshold;

second comparison means for comparing each wheel speed quantity to a speed threshold; and third comparison means for comparing each wheel acceleration quantity to a range defined by an upper acceleration threshold and a lower acceleration threshold.

21. The system of claims 20 wherein the decision means further comprise:

determining means, operatively associated with the first, second, and third comparison means, for determining that the test quantities are consistent with the overestimated reference speed condition if each wheel slip quantity exceeds the slip threshold, each wheel speed quantity exceeds the speed threshold, and each wheel acceleration quantity is less than the upper acceleration threshold and greater than the lower acceleration threshold.

22. The system of claim 14 wherein the selected subset of the plurality of wheels comprise a front-left wheel, a front-right wheel, and a rear wheel.

23. The system of claim 22 wherein the correcting means comprise:

first setting means for setting a front-left reference speed based on the front-left wheel speed;

second setting means for setting a front-right reference speed based on the front-right wheel speed; and third setting means for setting a rear reference speed based on the rear wheel speed.

24. A system for detecting and correcting overestimated reference speeds for a vehicle having a front-right wheel, a front-left wheel, and a rear axle with two rear wheels, the vehicle being capable of generating a first speed signal representative of a speed of the front-right wheel, a second speed signal representative of a speed of the front-left wheel, and a third speed signal representative of a speed of at least one wheel on the rear axle, the vehicle further being capable of calculating a first reference speed for the front-right wheel, a second reference speed for the front-left wheel, and a third reference speed for at least one wheel on the rear axle, the system comprising:

first computing means, operatively associated with the first speed signal, for computing a first speed quantity representative of the speed of the front-right wheel, a first slip quantity representative of a slip of the front-right wheel, and a first acceleration quantity representative of an acceleration of the front-right wheel, based on the first speed signal;

second computing means, operatively associated with the second speed signal, for computing a second speed quantity representative of the speed of the front-left wheel, a second slip quantity representative of a slip of the front-left wheel, and a second acceleration quantity representative of an acceleration of the front-left wheel, based on the second speed signal;

third computing means, operatively associated with the third speed signal, for computing a third speed quantity representative of the speed of at least one rear wheel, a third slip quantity representative of a slip of at least one rear wheel, and a third acceleration quantity representative of an acceleration of at least one rear wheel, based on the third speed signal;

first comparison means, operatively associated with the first, second, and third computing means, for comparing the first, second, and third slip quantities to corresponding first, second, and third slip thresholds;

second comparison means, operatively associated with the first, second, and third computing means, for comparing the first, second, and third speed quantities to corresponding first, second, and third speed thresholds;

third comparison means, operatively associated with the first, second, and third computing means, for comparing the first, second, and third acceleration quantities to corresponding first, second, and third upper acceleration thresholds and corresponding first, second, and third lower acceleration thresholds;

a counter, operatively associated with the first, second and third comparison means, wherein the counter is incremented if the first slip quantity exceeds the first slip threshold, the second slip quantity exceeds the second slip threshold, the third slip quantity exceeds the third slip threshold, the first speed quantity exceeds the first speed threshold, the second speed quantity exceeds the second speed threshold, the third speed quantity exceeds the third speed threshold, the first acceleration quantity is less than the first upper acceleration threshold and greater than the first lower acceleration threshold, the second acceleration quantity is less than the second upper acceleration threshold and greater than the second lower acceleration threshold, and the third acceleration quantity is less than the third upper acceleration threshold and greater than the third lower acceleration threshold;

decrement means, operatively associated with the counter and the first, second, and third comparison means, for reducing the counter by one if the first slip quantity exceeds the first slip threshold, the second slip quantity exceeds the second slip threshold, the third slip quantity exceeds the third slip threshold, the first speed quantity exceeds the first speed threshold, the second speed quantity exceeds the second speed threshold, the third speed quantity exceeds the third speed threshold, at least one of the first, second, and third acceleration quantities is greater than the corresponding first, second, and third upper acceleration threshold or less than the corresponding first, second, and third lower acceleration threshold, and the counter is not equal to zero;

first setting means, operatively associated with the counter, for setting the first reference speed equal to the first speed quantity if the counter attains a selected threshold;

second setting means, operatively associated with the counter, for setting the second reference speed equal to the second speed quantity if the counter attains the selected threshold;

third setting means, operatively associated with the counter, for setting the third reference speed equal to the third speed quantity if the counter attains the selected threshold; and controlling means, operatively associated with the first setting means, the second setting means, and the third setting means, for controlling the antilock brake system based on the first reference speed, the second reference speed, and the third reference speed.

25. The system of claim 24 further comprising:

first resetting means, operatively associated with the counter and the first comparison means, for resetting the counter to zero if at least one of the first, second, and third slip quantities is less than the corresponding first, second, and third slip threshold;

second resetting means, operatively associated with the counter and the second comparison means, for resetting the counter to zero if at least one of the first, second, and third speed quantities is less than the corresponding first, second, and third speed threshold; and third resetting means, operatively associated with the counter, for resetting the counter to zero if the counter attains the selected threshold.

* * * * *